US010618449B2

(12) United States Patent
Steury et al.

(10) Patent No.: US 10,618,449 B2
(45) Date of Patent: Apr. 14, 2020

(54) CAMPING TRAILER LIFT WITH NEW AND NOVEL POSTS OR JACKS

(71) Applicants: Edwin Steury, Goshen, IN (US); Mathew Steury, Goshen, IN (US)

(72) Inventors: Edwin Steury, Goshen, IN (US); Mathew Steury, Goshen, IN (US)

( * ) Notice: Subject to any disclaimer, the term of this patent is extended or adjusted under 35 U.S.C. 154(b) by 0 days.

(21) Appl. No.: 15/932,868

(22) Filed: May 11, 2018

(65) Prior Publication Data

US 2019/0344700 A1 Nov. 14, 2019

(51) Int. Cl.
*B60P 3/34* (2006.01)

(52) U.S. Cl.
CPC ................. *B60P 3/34* (2013.01); *B60P 3/341* (2013.01)

(58) Field of Classification Search
CPC .................................. B60P 3/34; B60P 3/341
USPC ................................ 296/156, 172, 173, 176
See application file for complete search history.

(56) References Cited

U.S. PATENT DOCUMENTS 4,171,843 A * 10/1979 Steury ....................... B60P 3/34 296/156
5,704,677 A * 1/1998 Steury ....................... B60P 3/34 296/171
5,769,485 A * 6/1998 Bontrager ................ B60P 3/34 296/171
5,951,096 A * 9/1999 Steury ....................... B60P 3/34 296/171
6,206,456 B1 * 3/2001 Steury ....................... B60P 3/34 254/45

* cited by examiner

*Primary Examiner* — Jason S Daniels

(57) ABSTRACT

A lift for a travel trailer top is disclosed which includes new and novel corner posts or jacks each of which comprises a plurality of telescoping members designed for strength and rigidity with the upper two or three sections of the posts or jacks containing integral, marginal portions for containing push-pull rods or springs and the bottom or lower section designed basically rectangular with a fastening leg and to contain the push-pull rods or springs and receive and stabilize the upper two or three sections when the top is up or down and may further be turned over, top to bottom, to be used as the bottom or lower section of the posts or jacks on the opposite side of the trailer eliminating the need to create lefts or rights of the bottom or lower sections.

2 Claims, 2 Drawing Sheets

18
22
12
24
28
18
16
26
14
10
20

18
12
22
24
28
54
40
30
38
56
32
42
46
36
60
34
48
20
26
44
52
50

CAMPING TRAILER LIFT WITH NEW AND NOVEL POSTS OR JACKS

The present invention relates to a novel lift for camping trailers of the type having Collapsible tops adapted to be raised during use and lowered for travel or storage.

BACKGROUND OF THE INVENTION

Camping trailers have long been provided with various lift mechanisms for raising and lowering the top. Certain of such mechanisms are disclosed in the present applicant's prior U.S. patent application Ser. No. 08/609,780 filed Mar. 1, 1996 now U.S. Pat. No. 5,704,677 for Drive Assembly For Retractable Tops Of A Mobile Housing and Ser. No. 08/940,139 filed Sep. 29, 1997, now U.S. Pat. No. 5,951,096 for Trailer Top Lift. These prior lifts utilize flexible push-pull rods or elements for activating telescoping corner posts or jacks which support the top. The flexible push-pull rods have usually been in the form of tightly coiled springs which slidably extend through guide conduits from a central actuating mechanism to the telescoping posts or jacks located at the four corners of the trailer body. It is desirable for the guide conduits to fit the push-pull flexible rods or springs closely so as to prevent them from buckling and assuring proper uniform lifting of the top. In the prior lift mechanisms, the guide conduits terminate at the lower ends of the corner posts or jacks which comprise a series of the telescoping sections of the progressively decreasing diameter from the bottom section to the top or uppermost section. The uppermost section has an inner diameter which closely fits the push-pull spring diameter. It has been found that the smallness of the diameters of the sections sometimes does not provide adequate mechanical support and resistance to side sway and forward and back sway to assure proper operation of such things as the side door of the trailer. While application Ser. No. 09/379,026 now U.S. Pat. No. 6,206,456 B1 granted to Steury Mar. 27, 2001 has successfully addressed the need for larger, stronger posts or jacks it has increased the weight and therefore the cost of the posts or jacks.

SUMMARY AND OBJECTS OF THE INVENTION

It is an object of the present invention to provide a novel trailer top lift structure which utilises simple and efficient push-pull elements for actuating telescopic posts or jacks and wherein the posts or jacks are constructed so as to prevent buckling of the push-pull elements and at the same time provide improved mechanical support for the top and greater resistance to side sway and front and back sway and do it more economically.

In carrying out the present invention it is contemplated that the lift may include a plurality of flexible push-pull rods, guide conduits and an actuator mechanism similar to those disclosed in the above identified applications and patents. The disclosures of which are incorporated herein by reference. The lift includes new and novel corner posts or jacks each of which comprises a plurality of telescoping two or three upper and intermediate sections for snugly receiving the push-pull elements and preventing them from buckling with the bottom or lower section being basically rectangular and designed to contain the push-pull rods and receiving the upper and intermediate two or three sections of the telescoping posts or jacks and reduces the weight and therefore the costs of the telescopic posts or jacks by a significant amount.

BRIEF DESCRIPTION OF THE INVENTION

DETAILED DESCRIPTION OF A PREFERRED EMBODIMENT

Figure 1:
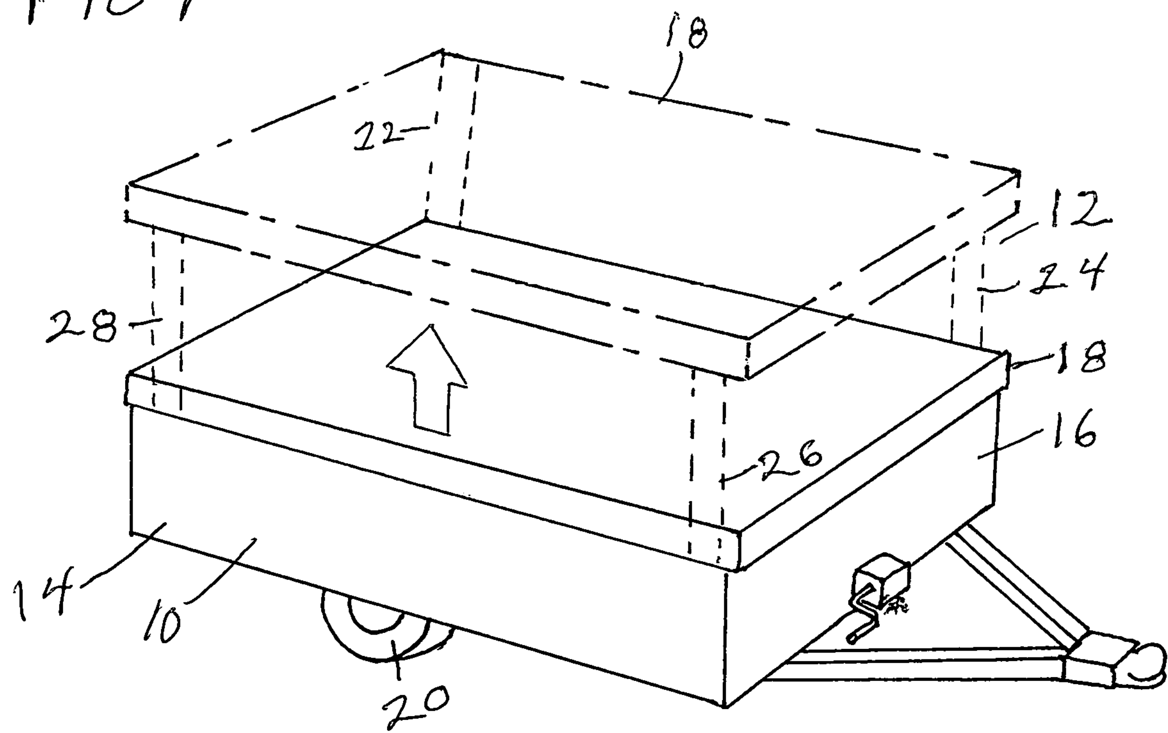
FIG. 1 is a perspective view of a camping trailer incorporating a lift of the present invention and showing the top in solid lines in a collapsed or lowered position and further showing the top in broken lines in a raised position.

While the invention may be susceptible to embodiment in different forms, there is shown in the drawings, and herein will be described in detail, specific embodiments with the understanding that the present disclosure is to be considered an exemplification of the invention and is not intended to limit the invention to that as illustrated and described herein.

Referring now more specifically to the drawings wherein like parts are designated by the same numerals throughout the various Figures, a camping trailer 10 incorporating a lift mechanism 12 embodying the present invention is shown in FIG. 1 the trailer 10 comprises a rectangular body 14 having side walls 16 and a top 18 adapted to be raised from a lowered position shown in solid lines in FIG. 1 to a raised position shown in broken lines in FIG. 1. The body 14 and top 18 may be of any well known construction and are supported for transport on wheels 20.

Figure 2:
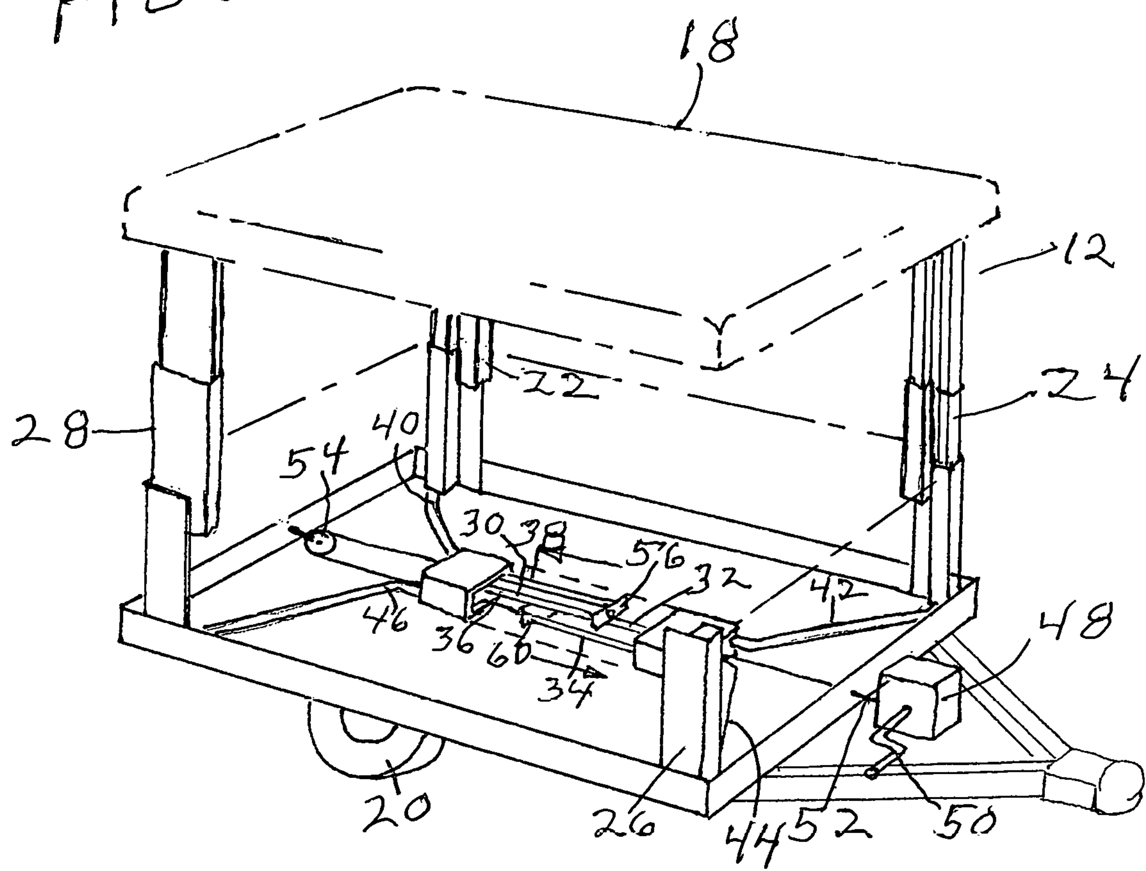
FIG. 2 is a simplified perspective view of a lift mechanism incorporating features of the present invention.

The lift 12 comprises four telescopic posts or jacks 22,24,26,28 mounted at the corners of the body 14 and connected to the top 18. As shown in FIG. 2, flexible push-pull elements or rods 30,32,34,36 extend from a centrally mounted actuator 38 to the posts or jacks 22,24,26,28, respectively, for operating 22,24,26,28 in the manner described below. The push-pull rods 30,32,34,36 are preferably in the form of tightly coiled springs and are directed to the posts or jacks 22,24,26,28, through guide conduits 40,42,44,46, respectively. The guide conduits 40,42,44,46 slidably and closely confine the push-pull rods 30,32,34,36 so as to keep them from buckling during lifting of the top 18.

The actuator 38 includes a winch 48 having an operating handle 50 adapted to be manually turned by an operator or an electric motor, not shown.

A cable 52 extends from the winch 48 through the trailer body 14 and around a pulley 54 for connection to the push-pull rods 30,32,34,36. A first crossmember 56 connects an upper or reverse run of the cable 52 with the push-pull rods 30 and 36 and a second crossmember 60 connects a lower run of the cable 52 with the push-pull rods 32 and 34.

For a more detailed disclosure of the actuator 38 and it's operation, reference is made to the above identified applications which disclosure has been herein incorporated by reference.

In accordance with the present invention, the posts or jacks 22,24,26,28 are identical to each other.

Figure 3:
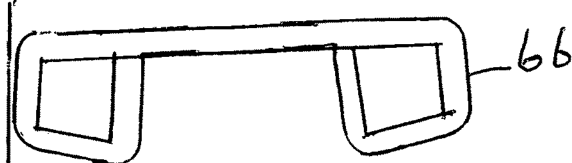
FIG. 3 is a top view of the upper, middle, and bottom or lower sections of the post or jack in accordance with the present invention.
Figure 3:
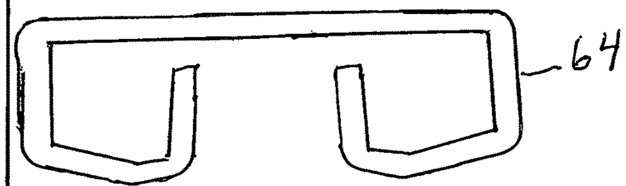
Figure 3:
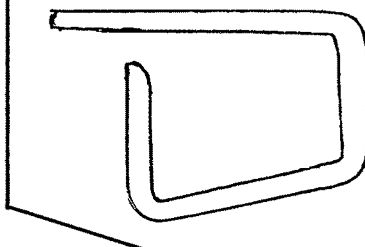
Figure 4:
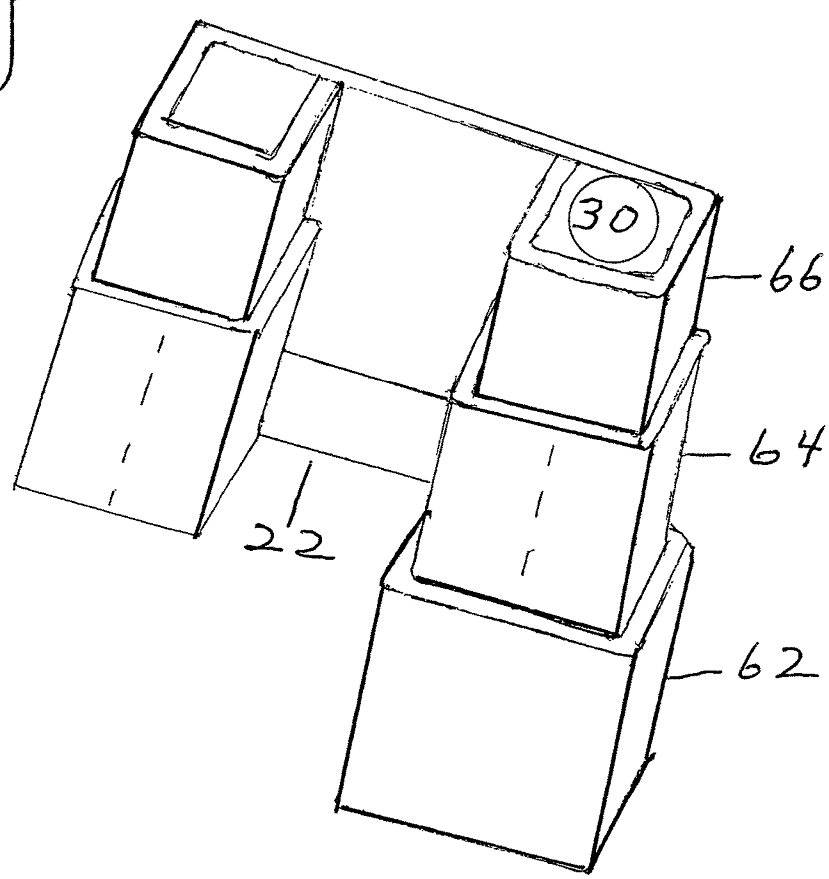
FIG. 4 is an enlarged perspective view of a corner post or jack constructed and assembled in accordance with the present invention.

Attention is invited to FIGS. 3 and 4 which illustrates post or jack 22 with the understanding that posts or jacks 24,26, 28 are identical in construction. As shown the post or jack 22 has three telescoping members 62,64,66. The bottom or lower member 62 which is basically a rectangular shape with an extended leg through which fasteners, not shown, may be placed to secure it to the inside of the walls 16 of the trailer 10 is unique in that it does not require marginal portions, but may be turned top to bottom to be used on the opposite side of the trailer 10 thus saving weight and therefor money.

While preferred embodiments of the present invention have been shown and described herein, many structural modifications may be made without departing from the spirit and scope of the appended claims.

The invention is claimed as follows:

1. A lift for raising and lowering a top of a mobile trailer comprising:

a trailer body having corners;

a trailer top;

a plurality of telescopic jacks located adjacent each corner of said trailer body and supporting said trailer top;

an actuator mechanism mounted on said trailer body, and a plurality of flexible push-pull elements connected to and extending from said actuator mechanism to said telescopic jacks for actuating said telescopic jacks to raise and lower said trailer top;

each of said plurality of telescopic jacks further comprising:

a plurality of telescoping members including an upper member, an intermediate member, and a lower member, each upper and intermediate member comprised of spaced apart upstanding portions being connected together through a connecting wall, and each lower member consisting of a singular upstanding portion having a leg extending outward of the upstanding portion through which fasteners may be placed to secure said lower member to an interior of said trailer body.

2. The lift of claim 1, wherein said upstanding portion of the lower member has a rectangular shape, said leg and said upstanding portion defining a cross section into which one of said upstanding members of the intermediate and upper members descend into when said telescopic jack is actuated to lower said trailer top.

* * * * *